US010723953B2

(12) United States Patent
Endou et al.

(10) Patent No.: US 10,723,953 B2
(45) Date of Patent: Jul. 28, 2020

(54) CARBIDE PRODUCING METHOD AND CARBIDE PRODUCING DEVICE

(71) Applicant: MITSUBISHI HEAVY INDUSTRIES ENVIRONMENTAL & CHEMICAL ENGINEERING CO., LTD., Yokohama-shi, Kanagawa (JP)

(72) Inventors: Yuuki Endou, Yokohama (JP); Tomoki Ichinose, Yokohama (JP); Keiichi Ishikawa, Yokohama (JP)

(73) Assignee: MITSUBISHI HEAVY INDUSTRIES ENVIRONMENTAL & CHEMICAL ENGINEERING CO., LTD., Yokohama-Shi, Kanagawa (JP)

( * ) Notice: Subject to any disclaimer, the term of this patent is extended or adjusted under 35 U.S.C. 154(b) by 54 days.

(21) Appl. No.: 15/745,909

(22) PCT Filed: Jul. 30, 2015

(86) PCT No.: PCT/JP2015/071643
§ 371 (c)(1),
(2) Date: Jan. 18, 2018

(87) PCT Pub. No.: WO2017/017838
PCT Pub. Date: Feb. 2, 2017

(65) Prior Publication Data
US 2018/0208851 A1 Jul. 26, 2018

(51) Int. Cl.
C10B 53/02 (2006.01)
C10B 47/30 (2006.01)
(Continued)

(52) U.S. Cl.
CPC ............. *C10B 21/10* (2013.01); *C01B 32/90* (2017.08); *C10B 7/10* (2013.01); *C10B 47/30* (2013.01);
(Continued)

(58) Field of Classification Search
CPC .......... C10B 47/30; C10B 1/10; C10B 57/10; C10B 53/02; C10B 47/44
See application file for complete search history.

(56) References Cited

U.S. PATENT DOCUMENTS

| 2,973,306 A | * | 2/1961 | Chick ..................... C10B 47/44 201/33 |
| 4,090,945 A | | 5/1978 | Reeves |

(Continued)

FOREIGN PATENT DOCUMENTS

| JP | H03-080295 U | 8/1991 |
| JP | 2008-180451 A | 8/2008 |

(Continued)

OTHER PUBLICATIONS

Quaak et al., "Energy from Biomass: A Review of Combustion and Gasification Technologies, vols. 23-422" 1999, World Bank Publications, pp. 3 and 4, avialable online at: https://books.google.com/books?id=M2WMrePllxkC&dq=relationship+between+LHV+and+bulk+density&source=gbs_navlinks_s (Year: 1999).*

(Continued)

*Primary Examiner* — Jonathan Luke Pilcher
(74) *Attorney, Agent, or Firm* — Manabu Kanesaka; Benjamin Hauptman; Kenneth Berner

(57) ABSTRACT

A carbide producing method for carbonizing a woody biomass to produce a carbide includes a pyrolysis process in which the woody biomass is pyrolyzed and carbonized, an LHV calculating process in which an LHV of the carbide which is a carbonized woody biomass is calculated, and a supplied heat amount control process in which an amount of heat supplied per unit time to the woody biomass in the pyrolysis process on the basis of the calculated LHV is controlled.

3 Claims, 2 Drawing Sheets

(51) Int. Cl.
*C10B 1/10* (2006.01)
*C10B 21/10* (2006.01)
*C10L 9/08* (2006.01)
*C01B 32/90* (2017.01)
*C10B 7/10* (2006.01)
*C10L 5/44* (2006.01)

(52) U.S. Cl.
CPC .............. *C10B 53/02* (2013.01); *C10L 5/447* (2013.01); *C10L 9/08* (2013.01); *C10B 1/10* (2013.01); *C10L 2290/02* (2013.01); *C10L 2290/06* (2013.01); *C10L 2290/58* (2013.01); *C10L 2290/60* (2013.01); *Y02E 50/10* (2013.01); *Y02E 50/14* (2013.01); *Y02E 50/30* (2013.01)

(56) References Cited

U.S. PATENT DOCUMENTS

| | | | | |
|---|---|---|---|---|
| 5,423,455 | A | * | 6/1995 | Ricciardi .............. G01G 11/086 141/1 |
| 5,821,396 | A | * | 10/1998 | Bouziane ................ C10B 47/30 585/241 |
| 8,388,813 | B1 | * | 3/2013 | Livingston ................ C10B 1/10 202/117 |
| 2008/0078552 | A1 | | 4/2008 | Donnelly et al. |
| 2011/0214343 | A1 | | 9/2011 | Wechsler et al. |
| 2012/0055775 | A1 | * | 3/2012 | Manderson ............... C10B 1/10 201/35 |
| 2014/0026791 | A1 | | 1/2014 | Okazaki et al. |
| 2018/0208851 | A1 | | 7/2018 | Endou et al. |

FOREIGN PATENT DOCUMENTS

| | | |
|---|---|---|
| JP | 2012-219176 A | 11/2012 |
| JP | 2014-065807 A | 4/2014 |
| JP | 2015-010137 | 1/2015 |

OTHER PUBLICATIONS

Google machine translation of JP 03-080295U (Year: 1991).*
PCT/ISA/210, "International Search Report for International Application No. PCT/JP2015/071643," dated Oct. 13, 2015
PCT/ISA/237 "Written Opinion of the International Searching Authority for International Application No. PCT/JP2015/071643," dated Oct. 13, 2015.
U.S.P.T.O., "Non-Final Rejection for U.S. Appl. No. 16/077,914 ," dated May 21, 2019.
U.S.P.T.O., "Final Rejection for U.S. Appl. No. 16/077,914 ," dated Oct. 16, 2019.
Meyer et al., "Design and Build of a 1 Kilowatt Organic Rankine Cycle Power Generator," 35th New Zealand Geothermal Workshop: 2013 Proceedings, Nov. 17-20, 2013, Rotorua, New Zealand, Available online at: https://www.geothermal-energy.org/pdf/IGAstandard/NZGW/2013/Meyer_Final.pdf (Year: 2013).
PCT/ISA/210, "International Search Report for International Application No. PCT/JP2017/005500," dated Mar. 14, 2017.
PCT/ISA/237, "Written Opinion of the International Searching Authority for International Application No. PCT/JP2017/005500," dated Mar. 14, 2017.

* cited by examiner

CARBIDE PRODUCING METHOD AND CARBIDE PRODUCING DEVICE

TECHNICAL FIELD

The present invention relates to a carbide-producing method and a carbide producing device through which a carbide is produced by pyrolyzing wooly biomass, wherein carbide in the specification means a carbonized woody biomass.

BACKGROUND ART

Attempts to increase a calorific value by performing a carbonizing treatment on woody biomass have been made for the purpose of utilizing the energy of woody biomass more efficiently. As the carbonizing treatment for woody biomass, for example, a method in which a pyrolysis furnace such as an external heat type pyrolysis gasification furnace is used, woody biomass is indirectly heated at a high temperature of 300° C. to 700° C. under a low oxygen atmosphere, and thus a carbide with an increased heat amount is produced is known.

As carbide producing methods, high temperature carbonization in which woody biomass is indirectly heated at a high temperature of 500° C. to 700° C. and half carbonization (torrefaction) in which woody biomass is indirectly heated at about 300° C. are known. In the high temperature carbonization, a sufficient treatment time is ensured at a predetermined temperature and thus it is possible to produce a carbide with a high gasification rate and a reduced self-heating property. In the half carbonization, by performing control within a very narrow temperature range, it is possible to produce a carbide in which both crushability and a residual calorific amount are compatible (for example, refer to Patent Literature 1).

CITATION LIST

Patent Literature

[Patent Literature 1]
Japanese Unexamined Patent Application, First Publication No. 2012-219176

SUMMARY OF INVENTION

Technical Problem

Incidentally, when co-combustion power generation in which a carbide is mixed with coal and combusted, for example, and power is generated in a coal fired power plant, in order to increase a content of the carbide with respect to the coal, crushability in a pulverizer such as a roller mill is important. That is, when a carbide with poor crushability is mixed with coal and is pulverized, a pulverizing power of the roller mill should exceed an acceptable value of the pulverizing power.

Therefore, it is necessary to consider the crushability of the carbide when a carbide appropriate for co-combustion power generation is produced. In addition, when a moisture content of a woody biomass which is a raw material of a carbide varies, since the crushability of the carbide varies, it is desirable to secure a more stable quality.

An object of the present invention is to produce a carbide having favorable crushability in a carbide producing method and a carbide producing device through which a woody biomass is pyrolyzed and carbonized.

Solution to Problem

According to a first aspect of the present invention, a carbide producing method includes a pyrolysis process in which a woody biomass is pyrolyzed and carbonized; an LHV calculating process in which an LHV of a carbide which is a carbonized woody biomass is calculated; and a supplied heat amount control process in which an amount of heat supplied per unit time to the woody biomass in the pyrolysis process is controlled on the basis of the calculated LHV.

In such a configuration, when an amount of heat supplied per unit time to the woody biomass is controlled on the basis of the LHV of the carbide, it is possible to produce a carbide having favorable crushability. That is, when an amount of heat supplied to the woody biomass is adjusted using a correlation between the LHV of the carbide and the crushability of the carbide so that the LHV of the carbide has an appropriate value, it is possible to produce a carbide with a stable quality.

In the LHV calculating process, the LHV may be calculated on the basis of a measurement value of a bulk density of the carbide.

In such a configuration, when the LHV of the carbide is calculated using a correlation between the bulk density of the carbide and the LHV of the carbide, it is possible to ascertain the LHV of the carbide quickly. Since there is a high correlation between the LHV of the carbide and the bulk density of the carbide, it is possible to calculate the LHV of the carbide immediately in contrast to a method of analyzing a carbide or the like.

In the pyrolysis process, an amount of heat supplied per unit time to the woody biomass may be corrected on the basis of a moisture content of the pyrolyzed woody biomass.

In such a configuration, if a moisture content of the woody biomass deviates from an appropriate numerical value, the moisture content of the woody biomass can be brought close to an appropriate numerical value.

According to a second aspect of the present invention, there is provided a carbide producing device, including a pyrolysis furnace in which a woody biomass received from an inlet is moved to an outlet and is pyrolyzed and carbonized; and a control device configured to control an amount of heat supplied to the woody biomass in the pyrolysis furnace, wherein the control device includes an LHV calculating unit configured to calculate an LHV of a carbide which is a carbonized woody biomass, and a supplied heat amount control unit configured to control an amount of heat supplied per unit time to the woody biomass on the basis of the calculated LHV.

The carbide producing device may include a bulk density measuring device configured to measure a bulk density of the carbide discharged from the pyrolysis furnace. The LHV calculating unit may calculate the LHV on the basis of the bulk density of the carbide measured by the bulk density measuring device.

The carbide producing device may include a moisture content measuring device configured to measure a moisture content of the woody biomass put into the pyrolysis furnace. The control device may correct an amount of heat supplied per unit time to the woody biomass on the basis of a moisture content of the woody biomass.

In the carbide producing device, the pyrolysis furnace may include an outer cylinder; an inner cylinder that rotates relative to the outer cylinder; a heater configured to supply a heating gas between the outer cylinder and the inner cylinder; a drive device configured to rotate the inner cylinder; and a heating gas amount adjusting device configured to adjust a flow rate of a heating gas supplied from the heater, the control device may include a rotational speed adjusting unit configured to control a rotational speed of the inner cylinder using the drive device; and a heating gas amount adjusting unit configured to control a flow rate of the heating gas using the heating gas amount adjusting device, and the supplied heat amount control unit may control an amount of heat supplied per unit time to the woody biomass by controlling at least one of the rotational speed adjusting unit and the heating gas amount adjusting unit.

Advantageous Effects of Invention

According to the present invention, it is possible to produce a carbide having favorable crushability.

DESCRIPTION OF EMBODIMENTS

Figure 1:
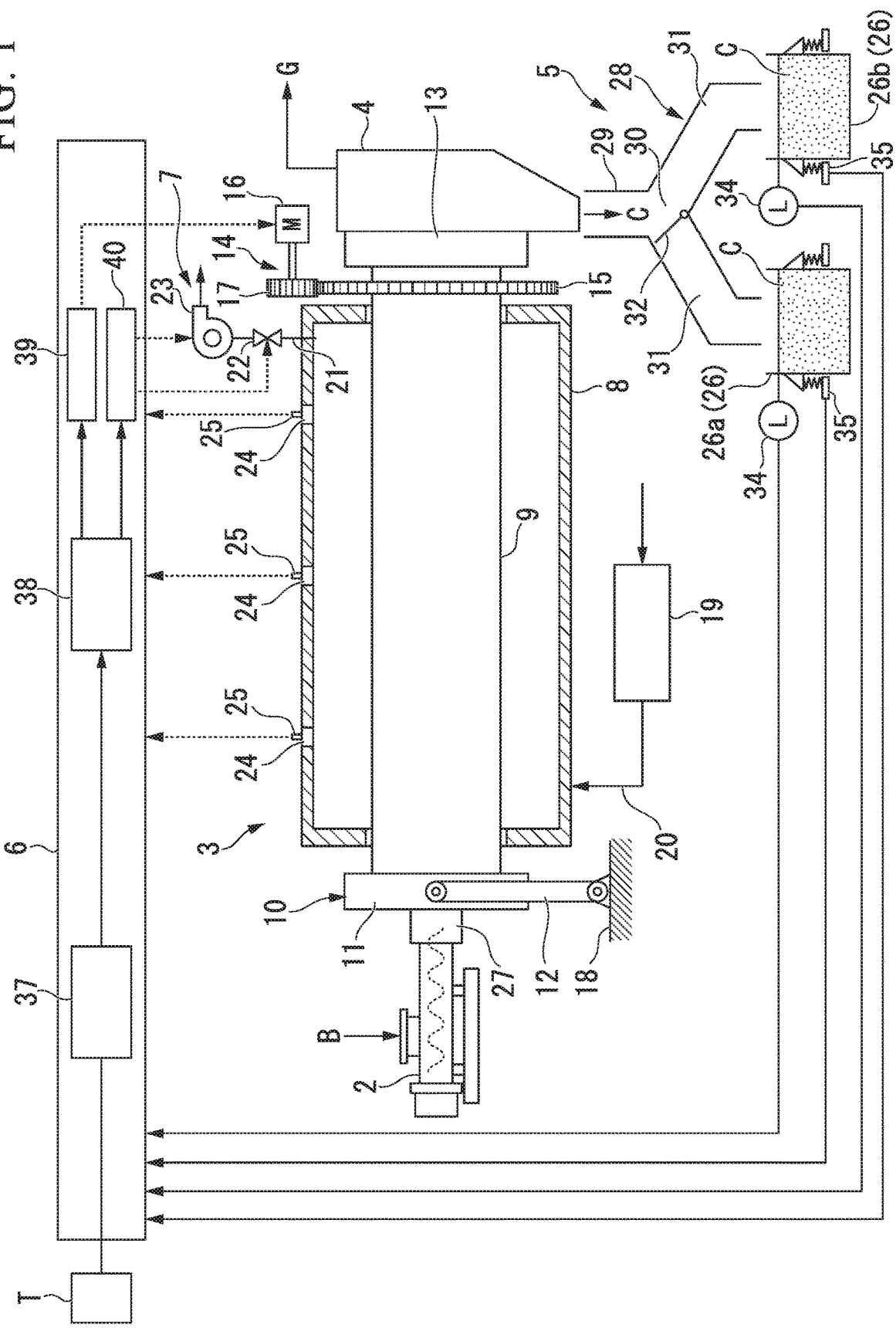
FIG. 1 is a schematic configuration diagram showing an example of a carbide producing device according to an embodiment of the present invention.

A carbide producing device according to an embodiment of the present invention will be described below in detail with reference to the drawings. FIG. 1 is a schematic configuration diagram showing an example of a carbide producing device according to the present embodiment.

As shown in FIG. 1, the carbide producing device according to the present embodiment includes a screw conveyor 2 through which a woody biomass B serving as a raw material is conveyed, an external heat type pyrolysis gasification furnace 3 in which the woody biomass B put into from the screw conveyor 2 is pyrolyzed and carbonized, a chute 4 from which a carbide C discharged from the external heat type pyrolysis gasification furnace 3 is discharged, a bulk density measuring device 5 configured to measure a bulk density of the carbide C discharged from the chute 4, and a control device 6 configured to control the external heat type pyrolysis gasification furnace 3 as main components.

The woody biomass B is a biomass made of wood (biological resources), and forest residues such as branches and leaves generated when wood is cut and materials are prepared, and wood pellets and wood chips generated from bark, sawdust, and the like generated in sawmilling factories.

The external heat type pyrolysis gasification furnace 3 is an indirect heating type pyrolysis furnace in which the woody biomass B is indirectly heated to cause a pyrolysis or gasification reaction.

The external heat type pyrolysis gasification furnace 3 is an external heat type rotary kiln furnace that includes an outer cylinder 8 (muffle) and an inner cylinder 9 (kiln shell) which rotates relative to the outer cylinder 8 and into which the woody biomass B is put.

In the carbide producing device according to the present embodiment, an external heat type rotary kiln furnace is used as the external heat type pyrolysis gasification furnace 3. However, the present invention is not limited thereto as long as the furnace is a type in which the woody biomass B may be indirectly heated. For example, an external heat type screw conveyor may be used as the external heat type pyrolysis gasification furnace 3.

The upstream side of the inner cylinder 9 can rotate about an axis and is supported by a movable side support portion 10 that is movable in an axial direction. The downstream side of the inner cylinder 9 can rotate about the axis and is supported by a fixed side support portion 13.

The screw conveyor 2 through which the woody biomass B is put in the inner cylinder 9 is provided on the movable side support portion 10 constituting an inlet of the inner cylinder 9 and the chute 4 from which the carbide C is discharged is provided on the fixed side support portion 13 constituting an outlet of the inner cylinder 9.

The movable side support portion includes an annular frame 11 that can rotate and supports the inner cylinder 9. Both side portions of the annular frame 11 can rotate and are supported on an upper end of a support member 12 which is raised from an installation surface 18 in a freely swinging manner.

A plurality of fins (or spirals, not shown) arranged to be inclined in a circumferential direction are provided on the inner wall of the inner cylinder 9. When the inner cylinder 9 is driven and rotated at a predetermined rotational speed (for example, 1 to 5 rpm) by a drive device 14, it is possible to transfer the woody biomass B received from the inlet side (upstream side) to the outlet side (downstream side) while heating the woody biomass B. Here, instead of providing the fins, the inner cylinder 9 can rotate about an axis that is slightly inclined with respect to the horizontal direction and is supported, and the woody biomass B can be transferred to the outlet side by the inclination and the rotation of the inner cylinder 9.

The drive device 14 includes a gear 15 provided on surface of the inner cylinder 9, a drive motor 16, and a pinion gear 17 that is attached to a rotation shaft of the drive motor 16 and fitted to the gear 15. The drive device 14 transmits driving of the drive motor 16 to the gear 15 to rotate the gear 15 and thus rotates the inner cylinder 9 around the axis.

The outer cylinder 8 is fixed to an installation portion through a support member (not shown) while it allows rotation and movement in the axial direction of the inner cylinder 9 and sealing with the inner cylinder 9 is ensured.

The movable side support portion 10 and the fixed side support portion 13 of the inner cylinder 9 form an air seal between a rotating portion and a non-rotating portion. An expansion 27 for absorbing displacement of the movable side support portion 10 in the axial direction is provided in a portion connecting the movable side support portion 10 and the screw conveyor 2.

A heating gas supply pipe 20 fed to heating gas from a heating gas combustion furnace 19 functioning as a heater configured to supply a heating gas is connected to one end of the outer cylinder 8. A heating gas delivery pipe 21 is connected to the other end of the outer cylinder 8. A heating gas amount adjusting damper 22 and an induced draft fan 23 functioning as a heating gas amount adjusting device 7 are provided in the heating gas delivery pipe 21.

A plurality of inspection windows 24 are provided on an upper portion of the outer cylinder 8 so as to be separated from each other in the axial direction. In each of the inspection windows 24, a non-contact thermometer 25 configured to measure a kiln shell temperature (an iron shell temperature of the inner cylinder 9) that faces an outer circumferential surface of the inner cylinder 9 that rotates about the axis is provided. A radiation thermometer can be used as the non-contact thermometer 25.

The control device 6 and the non-contact thermometer 25 are connected communicatively, and the kiln shell temperature measured by the non-contact thermometer 25 is input to the control device 6.

Since the kiln shell temperature is a temperature of a portion that comes directly in contact with the woody biomass B in the inner cylinder 9, a correlation with a pyrolysis temperature of the woody biomass B and the kiln shell temperature is high, and heating conditions are favorably reflected therein. Therefore, when the temperature heating the woody biomass B is controlled on the basis of the kiln shell temperature, it is possible to control the heating temperature stably. In particular, the kiln shell temperature varies depending on a moisture content of the woody biomass B. When the moisture content of the woody biomass B increases, since evaporation of moisture increases, the kiln shell temperature decreases. The control device 6 of the present embodiment uses the kiln shell temperature to measure a moisture content of the woody biomass B. That is, the non-contact thermometer 25 functions as a moisture content measuring device.

A method of measuring a moisture content of the woody biomass B is not limited to the above-described method. For example, it may be directly measured using an electrical resistance type sensor or a microwave type sensor.

The bulk density measuring device 5 includes a duct 28 into which the carbide C discharged from the chute 4 is introduced and two storage tanks 26 in which the carbide C introduced through the duct 28 is stored. The duct 28 is divided into two ducts on the downstream side. That is, the duct 28 includes an upstream side duct 29 provided on the upstream side, a branching portion 30, and a pair of downstream side ducts 31 provided downstream from the branching portion 30. A switching damper 32 is provided at the branching portion 30.

The carbide C introduced from the chute 4 into the upstream side duct 29 is introduced into one of the downstream side ducts 31 by the switching damper 32. The pair of downstream side ducts 31 are disposed on a first storage tank 26a and a second storage tank 26b so that the carbide C is introduced. The switching damper 32 is controlled by the control device 6.

A level meter 34 and a gravimeter 35 are provided at each of the storage tanks 26. The level meter 34 is a sensor that can detect the fact that a predetermined volume of the carbide C is stored in the storage tank 26. When a predetermined volume of the carbide C is stored in the storage tank 26, the level meter 34 can transmit a signal to the control device 6. As the level meter 34, for example, a sensor using infrared rays or a sensor using a contact type switch can be used.

The gravimeter 35 is a device that can measure a weight of the carbide C stored in the storage tank 26. The gravimeter 35 can transmit the measured weight to the control device 6.

The control device 6 is a device that controls an amount of heat supplied per unit time to the woody biomass B.

The control device 6 includes an LHV calculating unit 37 configured to calculate an LHV (lower heating value or net calorific value) of the carbide C and a supplied heat amount control unit 38 configured to control an amount of heat supplied per unit time to the woody biomass B on the basis of the calculated LHV.

In addition, the control device 6 includes a rotational speed adjusting unit 39 configured to control a rotational speed of the inner cylinder 9 using the drive device 14 and a heating gas amount adjusting unit 40 configured to control a flow rate of a heating gas using the heating gas amount adjusting device 7. The rotational speed adjusting unit 39 and the heating gas amount adjusting unit 40 are controlled by the supplied heat amount control unit 38.

Figure 2:
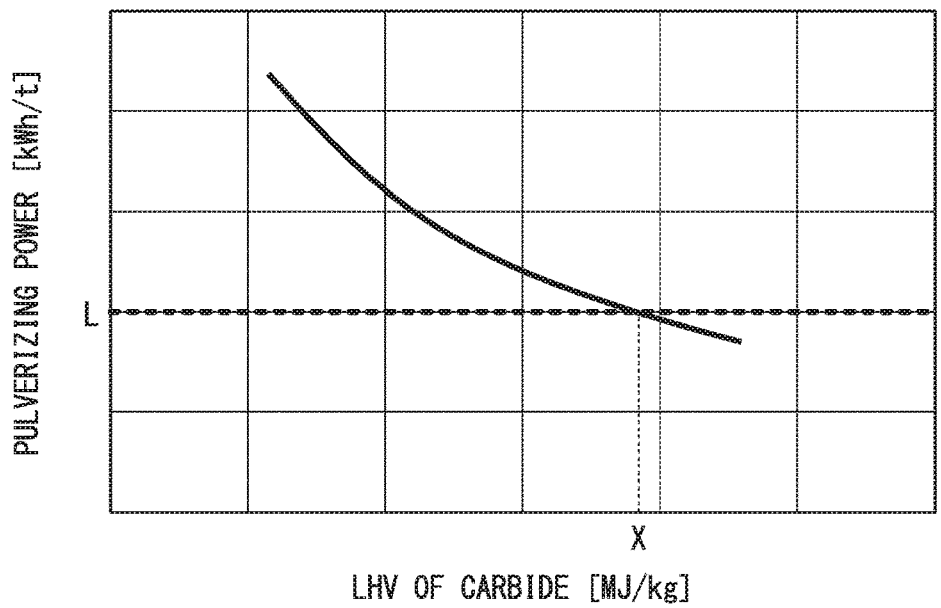
FIG. 2 is a graph showing a correlation between an LHV of a carbide and a pulverizing power of a pulverizer.

Here, as shown in FIG. 2, the inventors found that there is a correlation between an LHV of a carbide and a pulverizing power of a pulverizer such as a roller mill. FIG. 2 is a graph showing a correlation between the LHV of the carbide and the pulverizing power of the pulverizer. In FIG. 2, the horizontal axis represents the LHV [MJ/kg] of the carbide and the vertical axis represents the pulverizing power [kWh/t] of the pulverizer.

According to the graph (FIG. 2) obtained according to the studies by the inventors, when the LHV of the carbide increases, the pulverizing power of the pulverizer decreases (crushability of a carbide is improved), and when the LHV of the carbide decreases, the pulverizing power of the pulverizer increases.

Since the pulverizing power of the pulverizer then has an allowable value L, it can be understood that the LHV of the carbide needs to be X or more based on the graph.

The fact that the pulverizing power of the pulverizer is low indicates that the crushability of the carbide is favorable and the carbide has properties similar to those of coal. In addition, the fact that the pulverizing power of the pulverizer is high indicates that the crushability of the carbide is poor and the carbide has properties similar to those of wood.

The LHV of the carbide can be increased by increasing an amount of heat supplied per unit time to the woody biomass and can be reduced by reducing an amount of heat supplied per unit time to the woody biomass.

That is, in order to improve the crushability of the carbide (increase the LHV of the carbide), it is necessary to increase an amount of heat supplied per unit time to the woody biomass.

However, the LHV of the carbide is not necessarily high. When an amount of heat supplied to the woody biomass is increased too much in order to increase the LHV of the carbide, an excess pyrolysis gas is generated due to pyrolysis and the yield deteriorates. Therefore, the LHV of the carbide is a value indicated by X in FIG. 2 or more and is preferably a value close to X.

Figure 3:
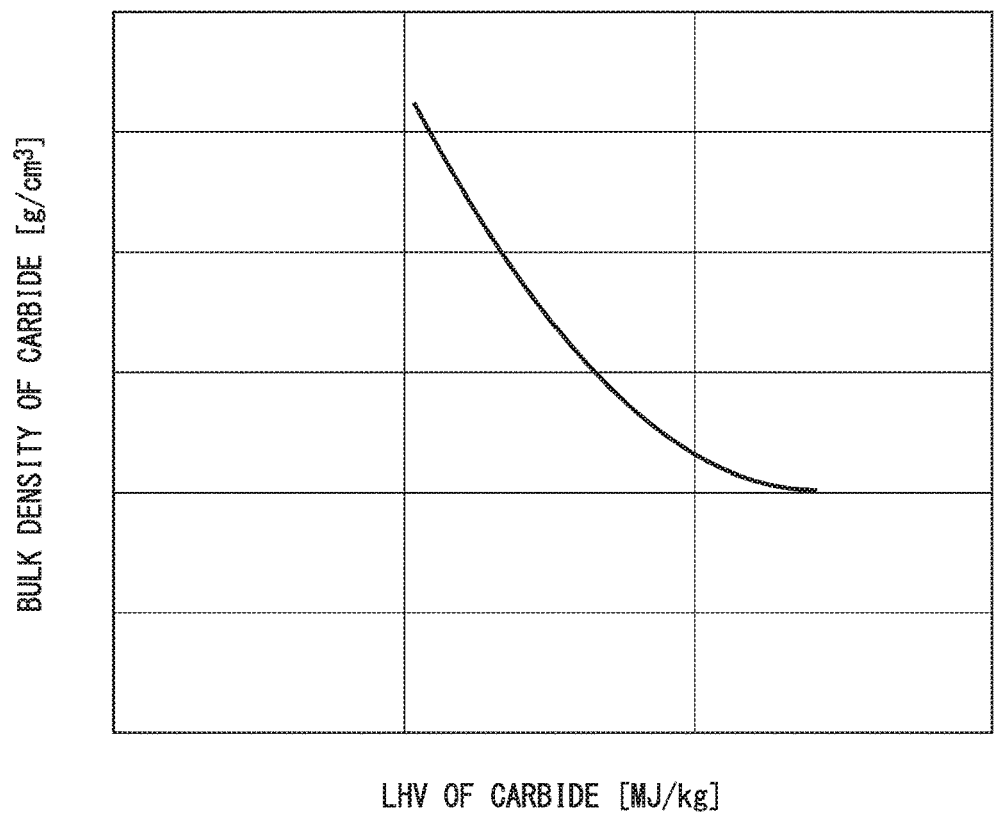
FIG. 3 is a graph showing a correlation between an LHV of a carbide and a bulk density of a carbide.

In addition, as shown in FIG. 3, the inventors found that there is a correlation between an LHV of a carbide and a bulk density of the carbide. FIG. 3 is a graph showing a correlation between the LHV of the carbide and a bulk density of the carbide. In FIG. 3, the horizontal axis represents the LHV [MJ/kg] of the carbide and the vertical axis represents a bulk density [g/cm$^3$] of the carbide.

According to the graph (FIG. 3) obtained from the studies by the inventors, when the bulk density decreases, the LHV of the carbide increases, and when the bulk density increases, the LHV decreases.

The control device 6 of the present embodiment can refer to a table T (refer to FIG. 1) in which the correlation between the bulk density and the LHV of the carbide shown in FIG. 3 is stored. That is, the control device 6 can calculate the LHV of the carbide on the basis of the bulk density of the carbide.

Next, a carbide producing method using the carbide producing device according to the present embodiment will be described.

The carbide producing method of the present embodiment includes a pyrolysis process in which a woody biomass B is pyrolyzed and carbonized, an LHV calculating process in which an LHV of a carbide C which is the carbonized woody biomass B is calculated, and a supplied heat amount control process in which an amount of heat supplied per unit time to the woody biomass B in the pyrolysis process is controlled on the basis of the calculated LHV.

A dryer (not shown) is disposed on the upstream side of the external heat type pyrolysis gasification furnace 3, and the woody biomass B which is dried by the dryer and includes moisture that is adjusted to a predetermined amount is introduced into the inner cylinder 9 of the external heat type pyrolysis gasification furnace 3 by the screw conveyor 2.

A heating gas from the heating gas combustion furnace 19 is supplied into the outer cylinder 8 of the external heat type pyrolysis gasification furnace 3 due to an induction action of the induced draft fan 23, and the inner cylinder 9 positioned inside the outer cylinder 8 is heated from the outer circumferential surface due to the heating gas.

In the pyrolysis process, the woody biomass B introduced into the inner cylinder 9 is indirectly heated and carbonized at a high temperature of 300° C. to 700° C. under conditions in which oxygen is almost excluded.

Specifically, the woody biomass B is transferred toward the outlet side and heated as the inner cylinder 9 rotates. Accordingly, first, moisture remaining in the woody biomass B is evaporated. Pyrolysis of organic components occurs when moisture is completely evaporated. As the pyrolysis proceeds, the woody biomass B is carbonized while a pyrolysis gas G is generated and is discharged from the chute 4 as the generated carbide C (solid fuel) with a predetermined degree of carbonization.

On the other hand, the pyrolysis gas G generated due to the pyrolysis is introduced from the chute 4 into the heating gas combustion furnace 19 and is combusted together with an auxiliary fuel and combustion air whose heat is exchanged in the heating gas delivery pipe 21, and some of the combustion gas is refluxed to the heating gas combustion furnace 19 and combusted together with an auxiliary fuel in the heating gas combustion furnace 19, and is used for heating in the external heat type pyrolysis gasification furnace 3.

In the pyrolysis process, an amount of heat supplied per unit time to the woody biomass B is adjusted by the heating gas amount adjusting unit 40 and the rotational speed adjusting unit 39. Specifically, an amount of heat supplied per unit time to the woody biomass B is adjusted when a degree of opening of the heating gas amount adjusting damper 22 of the heating gas amount adjusting device 7 is adjusted, and backup control is performed so that a degree of opening of the heating gas amount adjusting damper 22 is maintained in a predetermined range by adjusting a number of rotations of the induced draft fan 23.

In addition, an amount of heat supplied per unit time to the woody biomass B is adjusted when the rotational speed adjusting unit 39 controls the drive device 14 and a number of rotations (rotational speed) of the inner cylinder 9 is changed. For example, when the number of rotations of the inner cylinder 9 is reduced, it is possible to supply a larger amount of heat to the woody biomass B.

As described above, in the carbide producing method of the present embodiment, an amount of heat supplied per unit time to the woody biomass B is controlled on the basis of the LHV of the carbide C.

The LHV calculating process is a process of calculating an LHV of the produced carbide C.

In the LHV calculating process, first, the carbide C discharged through the chute 4 is introduced into one of the storage tanks 26 (here, the first storage tank 26a). When a volume of the carbide C stored in the first storage tank 26a reaches a predetermined volume, the level meter 34 sends a signal to the control device 6.

When the signal from the level meter 34 is received, the control device 6 acquires a weight of the carbide C at that time from the gravimeter 35. The control device 6 calculates a bulk density of the carbide C by dividing the weight of the carbide C by the volume. That is, when the volume of the carbide C is set as V, and the weight of the carbide C at the volume V is set as M, the bulk density D of the carbide C can be calculated by $D=M/V$. In addition, the bulk density of the carbide C can be measured according to the JIS K 2151 6 "bulk density test method."

When calculation of the bulk density of the carbide C stored in the first storage tank 26a is completed, the carbide C in the first storage tank 26a is discharged according to a predetermined method.

The control device 6 operates the switching damper 32 so that the carbide C is introduced into the other storage tank 26 (the second storage tank 26b) at the same time as calculation of the bulk density of the carbide C in the first storage tank 26a is completed. Accordingly, the carbide C is stored in the second storage tank 26b. An LHV of the carbide C is calculated by the same method used to calculate the LHV of the carbide C in the first storage tank 26a below.

When the first storage tank 26a and the second storage tank 26b are alternately used, it is possible to calculate the bulk density of the carbide C continuously.

The LHV calculating unit 37 calculates an LHV of the carbide C stored in the storage tank 26 using the table T (the correlation shown in the graph in FIG. 3) in which a correlation between the LHV of the carbide C and the bulk density of the carbide C is stored.

The supplied heat amount control unit 38 controls at least one of the heating gas amount adjusting unit 40 and the rotational speed adjusting unit 39 on the basis of the LHV of the carbide C calculated by the LHV calculating unit 37.

The supplied heat amount control unit 38 issues an instruction to reduce the LHV of the carbide C when the LHV of the carbide C is larger than X (refer to FIG. 2), that is, when the crushability of the carbide C is favorable. For example, the heating gas amount adjusting unit 40 is controlled such that an amount of heating gas is reduced. When the LHV of the carbide C is not sufficiently reduced due to the reduced amount of heating gas, the rotational speed adjusting unit 39 is controlled, a rotational speed of the inner cylinder 9 increases, and thus an amount of heat supplied per unit time to the woody biomass B is reduced.

The supplied heat amount control unit 38 issues an instruction to increase the LHV of the carbide C when the LHV of the carbide C is smaller than X, that is, when the crushability of the carbide C is poor. For example, the heating gas amount adjusting unit 40 is controlled such that an amount of heating gas is increased. When the LHV of the carbide C does not sufficiently increase due to the increased heating gas, the rotational speed adjusting unit 39 is controlled such that a rotational speed of the inner cylinder 9 is reduced and an amount of heat supplied per unit time to the woody biomass B is increased.

In addition, the control device 6 has a function of correcting an amount of heat supplied per unit time to the woody biomass B on the basis of a moisture content of the woody biomass B measured by the non-contact thermometer 25 functioning as a moisture content measuring device.

That is, when a moisture content of the woody biomass B varies over a short time (for example, 50% to 55%), since an amount of heat required for evaporation of moisture significantly increases, an indicated value of the non-contact thermometer 25 is reduced. When a trend (a decrease or an increase) of the non-contact thermometer 25 is transmitted in advance to the LHV calculating unit 37, before the LHV of the carbide C becomes smaller than X, at least one of the heating gas amount adjusting unit 40 and the rotational speed adjusting unit 39 is controlled.

According to the above embodiment, when an amount of heat supplied per unit time to the woody biomass B is controlled on the basis of the LHV of the carbide C, it is possible to produce the carbide C having favorable crushability. That is, when an amount of heat supplied to the woody biomass B is adjusted using a correlation between the LHV of the carbide C and the crushability of the carbide C so that the LHV of the carbide C has an appropriate value, it is possible to produce the carbide C with a stable quality.

In addition, when the LHV of the carbide C is calculated using a correlation between the bulk density of the carbide C and the LHV of the carbide C, it is possible to ascertain the LHV of the carbide C quickly. Since there is a high correlation between the LHV of the carbide C and the bulk density of the carbide C, it is possible to calculate the LHV of the carbide C immediately in contrast to a method of analyzing the carbide C or the like.

In addition, when an amount of heat supplied per unit time to the woody biomass B is corrected on the basis of the moisture content of the pyrolyzed woody biomass B, if the moisture content of the woody biomass B deviates from an appropriate numerical value, the moisture content of the woody biomass B can be brought close to an appropriate numerical value.

Here, while the two storage tanks 26 have been used as the bulk density measuring device 5 in the above embodiment, the present invention is not limited thereto. For example, when the stored carbide C can be quickly discharged, the bulk density may be measured using only one storage tank 26. In addition, three or more storage tanks 26 may be installed.

In addition, while the LHV of the carbide C has been estimated and calculated using the bulk density of the carbide C in the above embodiment, the present invention is not limited thereto. For example, the when LHV can be measured using a calorimeter, this may be used.

REFERENCE SIGNS LIST

1 Carbide producing device
2 Screw conveyor
3 External heat type pyrolysis gasification furnace
4 Chute
5 Bulk density measuring device
6 Control device
7 Heating gas amount adjusting device
8 Outer cylinder
9 Inner cylinder
10 Movable side support portion
11 Annular frame
12 Support member
13 Fixed side support portion
14 Drive device
15 Gear
16 Drive motor
17 Pinion gear
18 Installation surface
19 Heating gas combustion furnace
20 Heating gas supply pipe
21 Heating gas delivery pipe
22 Heating gas amount adjusting damper
23 Induced draft fan
24 Inspection window
25 Non-contact thermometer (moisture content measuring device)
26 Storage tank
26a First storage tank
26b Second storage tank
27 Expansion
28 Duct
29 Upstream side duct
30 Branching portion
31 Downstream side duct
32 Switching damper
34 Level meter
35 Gravimeter
37 LHV calculating unit
38 Supplied heat amount control unit
39 Rotational speed adjusting unit
40 Heating gas amount adjusting unit
B Woody biomass
C Carbide
G Pyrolysis gas
T Table

The invention claimed is:

1. A carbonized woody biomass producing device comprising:
   a pyrolysis furnace in which a woody biomass received from an inlet is moved to an outlet and is pyrolyzed and carbonized;
   a control device configured to control an amount of heat supplied to the woody biomass in the pyrolysis furnace; and
   a bulk density measuring device configured to measure a bulk density of a carbonized woody biomass discharged from the pyrolysis furnace,
   wherein the control device includes
   an LHV calculating unit configured to calculate an LHV of the carbonized woody biomass from the bulk density of the carbonized woody biomass measured by the bulk density measuring device on a basis of a non-linear correlation between the bulk density and the LHV of the carbonized woody biomass, and
   a supplied heat amount control unit configured to control an amount of heat supplied per unit time to the woody biomass on a basis of the calculated LHV.

2. The carbonized woody biomass producing device according to claim 1, further comprising
   a moisture content measuring device configured to measure a moisture content of the woody biomass put into the pyrolysis furnace,
   wherein the control device corrects an amount of heat supplied per unit time to the woody biomass on a basis of a moisture content of the woody biomass.

3. The carbonized woody biomass producing device according to claim 1, wherein the pyrolysis furnace includes
   an outer cylinder;
   an inner cylinder that rotates relative to the outer cylinder;
   a heater configured to supply a heating gas between the outer cylinder and the inner cylinder;
   a drive device configured to rotate the inner cylinder; and
   a heating gas amount adjusting device configured to adjust a flow rate of a heating gas supplied from the heater, wherein the control device further includes
a rotational speed adjusting unit configured to control a rotational speed of the inner cylinder using the drive device; and
a heating gas amount adjusting unit configured to control a flow rate of the heating gas using the heating gas amount adjusting device, and
wherein the supplied heat amount control unit controls an amount of heat supplied per unit time to the woody biomass by controlling at least one of the rotational speed adjusting unit and the heating gas amount adjusting unit.

* * * * *